(12) United States Patent
Leppanen et al.

(10) Patent No.: US 10,084,634 B2
(45) Date of Patent: Sep. 25, 2018

(54) USER PRESENCE INFORMATION COMMUNICATION SYSTEM

(75) Inventors: Eva-Maria Leppanen, Tampere (FI);
Juha Kalliokulju, Vesilahti (FI);
Mikko Lonnfors, Helsinki (FI);
Krisztian Kiss, Del Mar, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 10/529,577

(22) PCT Filed: Oct. 9, 2002

(86) PCT No.: PCT/IB02/04381
§ 371 (c)(1),
(2), (4) Date: Mar. 30, 2005

(87) PCT Pub. No.: WO2004/034718
PCT Pub. Date: Apr. 22, 2004

(65) Prior Publication Data
US 2005/0282526 A1     Dec. 22, 2005

(51) Int. Cl.
*H04L 29/06* (2006.01)
*H04L 29/08* (2006.01)

(52) U.S. Cl.
CPC .............. *H04L 29/06* (2013.01); *H04L 67/04* (2013.01); *H04L 67/24* (2013.01); *H04L 69/329* (2013.01)

(58) Field of Classification Search
CPC ...................................................... H04M 3/42
USPC .............. 709/204, 206; 379/265.06; 455/414
See application file for complete search history.

(56) References Cited

U.S. PATENT DOCUMENTS

| | | | |
|---|---|---|---|
| 6,549,773 B1 | 4/2003 | Linden et al. | |
| 6,668,167 B2* | 12/2003 | McDowell et al. | 455/412.1 |
| 6,822,945 B2* | 11/2004 | Petrovykh | 370/270 |
| 6,885,861 B2* | 4/2005 | Koskelainen | 455/414.2 |
| 6,993,327 B2* | 1/2006 | Mathis | 455/414.1 |
| 7,020,480 B2* | 3/2006 | Coskun et al. | 455/466 |
| 7,302,270 B1* | 11/2007 | Day | 455/456.1 |

(Continued)

FOREIGN PATENT DOCUMENTS

| | | |
|---|---|---|
| CN | 1326652 A | 12/2001 |
| EP | 0 248 484 A2 | 12/1987 |

(Continued)

OTHER PUBLICATIONS

Takahashi, et al., "FieldCast Technology to Realize Access Integrated Service for Ubiquitous Service", NTT Technical Review, vol. 14, No. 6, Jun. 1, 2002, pp. 27-29.

(Continued)

*Primary Examiner* — Sulaiman Nooristany
(74) *Attorney, Agent, or Firm* — Alston & Bird LLP (57) ABSTRACT

This invention relates to a communication system comprising a least one user with which presence information is associated, said presence information comprising a plurality of parts, at least one of said parts comprising information identifying an application for which said at least one part is intended; and at least one entity to which presence information associated with said at least one user is provided, said at least one entity having at least one entity application, said at least one entity being arranged to use said information to obtain the at least one part intended for said at least one entity application.

38 Claims, 4 Drawing Sheets

(56) References Cited

U.S. PATENT DOCUMENTS

| | | | |
|---|---|---|---|
| 2002/0131395 A1* | 9/2002 | Wang | H04W 92/24 370/349 |
| 2002/0147000 A1* | 10/2002 | Holmes-Kinsella | 455/405 |
| 2003/0009530 A1* | 1/2003 | Philonenko et al. | 709/206 |
| 2003/0073440 A1* | 4/2003 | Mukherjee et al. | 455/435 |
| 2003/0177184 A1* | 9/2003 | Dickerman et al. | 709/204 |
| 2004/0062383 A1* | 4/2004 | Sylvain | 379/265.06 |

FOREIGN PATENT DOCUMENTS

| | | |
|---|---|---|
| EP | 1 248 484 | 10/2002 |
| WO | WO 01/72055 A2 | 9/2001 |
| WO | WO 02/43351 A2 | 5/2002 |
| WO | WO 02/096128 | 11/2002 |

OTHER PUBLICATIONS

Common Presence and Instant Messaging (CPIM) Presence Information Data Format; Internet Engineering Task Force (IETF) Network Working Group, May 2002, available at http://tools.ietf.org/html/draft-ietf-impp-cpim-pidf-05, 23 pages.

3GPP TS 24.229 v2.0.1 (Mar. 2002) 3$^{rd}$ Generation Partnership Project; Technical Specification Group Core Network; IP Multimedia Call Control Protocol based on SIP and SDP; Stage 3 (Release 5).

Search Report for PCT/IB02/04381 dated Jun. 12, 2003.

Takahashi et al., "FieldCast Technology to Realize Access Integrated Service for Ubiquitous Service," *NTT Technical Review*, Jun. 2000.

Office Action for Japanese Application No. 2008-212418 dated Apr. 19, 2011.

Takahashi, K., *Basic Technologies for Supporting Ubiquitous Services vol. 2, Ubiquitous Services for Realizing HIKARI Vision*, The Telecommunications Association, NTT Technology Review, vol. 14, No. 6, (2002), pp. 26-29.

Second Office Action for Chinese Application No. 2008101440357 dated May 11, 2011.

Office Action for Chinese Application No. 200810144035.7 dated Sep. 4, 2014.

International Preliminary Report on Patentability for Application No. PCT/IB2002/004381 dated Aug. 6, 2004.

Office Action for Chinese Application No. 200810144035.7 dated Nov. 24, 2011.

Office Action for Chinese Application No. 200810144035.7 dated Nov. 11, 2010.

Office Action for Canadian Application No. 2,498,382 dated Oct. 7, 2009.

* cited by examiner

USER PRESENCE INFORMATION COMMUNICATION SYSTEM

FIELD OF INVENTION

The present invention relates to a communication system, in particular to the provision a presence service in a communication system.

BACKGROUND TO THE INVENTION

A diverse range of communication systems are in use today enabling communication between two or more entities, such as user equipment and/or other nodes associated with the system.

Communication systems proving wireless communication for user terminals or other nodes are known. An example of a wireless system is a public land mobile network (PLMN). A PLMN is typically a cellular network wherein a base transceiver station (BTS) or similar access entity serves user equipment (UE) such as mobile stations (MS) via a wireless interface. The operation of the apparatus required for the communication is usually controlled by one or more control entities, which themselves may be interconnected. One or more gateway nodes provide for connecting the PLMN to other networks. Examples of other such networks are another cellular network, a public switched telephone network (PSTN) and packet switched data networks such as an IP (Internet Protocol) based network. The communication between the user equipment and the other elements of the communication system, are based on an appropriate communications protocol, which defines the "rules" under which communication is handled in the system.

In the current third generation (3G) wireless system, there are defined various servers for the handling of different communication services for mobile users. These include servers that provide call state control functions, known as CSCFs. Control functions may also be provided by entities such as a home subscriber server (HSS) and applications by various application servers. The HSS is typically for permanently storing the user's profile and used during authentication. For example, in the Release 5 architecture for 3G, as specified by the $3^{rd}$ Generation Partnership Project (3GPP), these entities can be found located in the IP-Multimedia Subsystem (IMS).

The IMS network may sit at the hub of the 3G architecture, supporting an IP based network that handles both traditional voice telephony and multimedia services. The 3GPP has chosen Session Initiation Protocol (SIP) as a core session signalling protocol for 3G networks. SIP has been developed by the Internet Engineering task Force (IETF). Those interested can find the 3GPP specification 24.229 describing the IMS network's basic operation from an SIP perspective titled "IP Multimedia Call Control Protocol based on SIP and SDP" at http://www.3gpp.org/ftp/Specs/Latest-drafts/24229-201.zip. SIP is a request/response style protocol, in the sense that for every message sent from a source, there is an associated response from the destination confirming receipt of the sent message. (The acknowledgement ACK message is a special case to which no response is sent)

For example, in a 3G network, when a user first switches on his mobile terminal, he must register his user ID or address with the network before allowing the terminal to fully connect. This is done by sending an SIP 'REGISTER' message from the terminal to the IMS, which includes details of the users address. The IMS receives and processes this information using a serving call state control function (S-CSCF), which in this context is referred to as the "registrar". The REGISTER message is only used to provide mapping between a user's alias and contact address e.g. mapping alias sip:mikko.lonnfors@sonera.com to a terminal's IP address. The IMS acknowledges the registration by sending a suitable acknowledge message (e.g. 200 OK message) in accordance with SIP. Subsequent registrations also take place (re-'REGISTER') whenever the preceding registration has expired or is expiring, or when there is a change in the status of the user. When a user wishes to set up a session with another user, such as a voice call or messaging session (there is another way of sending messages i.e. with a SIP MESSAGE and in this case session establishment is not required), the session negotiation will also be performed under SIP.

Application servers (AS) may supply services via the IMS such as instant messaging, presence, local traffic reports, and conferencing facilities. An AS may reside within the IMS network, or outside of it. Typically the AS is external when the service supported is provided by a third party One specific example of status information is presence information. Users or application servers subscribing to a presence service can determine the ability and availability of another user e.g. to accept a call (depending on the equipment and service provider) among other presence features/attributes. However, in systems supporting SIP, presence can assume a variety of indicators such as 'in the office and available for all calls', 'at home and available for private calls only', and 'busy in call' (or at least appear that way). Thus presence information allows a user to ascertain the availability of another user before attempting to make a call. The presence service can provide more than just information such as available/not available. It can contain visual, animated or sound elements and can describe various issues for example related to a game session.

This presence service which is being standardised in OMA 8 (open mobile alliance (www.openmobilealliance.org)), 3GPP and IETF is gaining more and more attention. It is expected that the number of presence aware applications will increase in future. As the number of applications increase it also increases the amount of presence information. From the receiving terminal perspective the increase of information poses a challenge as to how to treat the presence information i.e. which parts of the presence information are relevant to which application(s). A terminal may run one or more applications. For example, the terminal can run a dynamic phone book application and a games application.

In the current IETF and 3GPP models, a tuple structure is used. The tuple contains a 'random' TUPLE ID which does not have any semantics i.e. it cannot be used describe the purpose of the tuple. In each tuple there can be several attributes. Moreover, different tuples may have attributes that have same name but are intended to be used/interpreted differently depending on the sending/receiving application. For example the presence information can contain two tuples (one for games and one for a dynamic phonebook (DPB)) and each of these tuples may contain a status field. The dynamic phone book may have been designed to understand status values: available, discreet, not available whereas the game may be designed to understand status values: shooting, dead, paused, lost. As can be seen from this example, the status fields have to be delivered to the correct application if they are to have the correct meaning. This is a problem when a terminal has two or more applications. This is also a problem even if the receiving terminal has only one application and sending terminal or presentity has multiple ones. If the data as provided in the example is delivered to the terminal having only e.g. DPB, the receiving terminal needs to be able to determine which tuple was intended for the DPB application.

Currently, there is no mechanism to pass the information to the correct applications other than for each application to check each tuple and see if the status values have any meaning for the application. In other words a trial and error approach is adopted. However, this creates uncertainty as to correctness of the information. This is because in some cases even it the value may be the same for an attribute, it may be interpreted incorrectly by the wrong application. An example of this is as follows: a sending terminal has a DPB and a IM (instant messaging) application. It sets status values: DPB=Closed, IM=Open. In this example both applications would use only status values open and closed. Now if the receiving terminal only has an IM application and it receives both the DPB and IM statuses. If the receiving terminal tries the first status value of DPB it understands it and presents that to the user via the IM application saying that IM application in the presentity's terminal was closed even though it was open.

It has been proposed that where a user wants to obtain presence information about one other user that the user is able to include filters to reduce the data from the presence server, that is the presence information. These filters are able to reduce the data from the presence server to include only parts that are of interest for the user.

The approach where both the tuple identities are used as a filtering criteria by watchers (users requesting presence information) and also the authorization is based on tuple identities has many disadvantages. If for example a user being watched has 4 tuples (T1, T2, T3 and T4) and one watcher is only interested in tuples T2 and T3, the watcher sets filters to allow only tuples T2 and T3 to be notified to him the watched user may then decide for some reason to start showing different values to the particular watcher concerning all tuples. Therefore the watched user creates new tuples T5, T6, T7 and T8 and creates a new access list, which allows the watcher to see tuples T5-T8, but not the tuples T1-T4. But the watcher has set the filtering based on the tuple identity, which means that no tuples are provided to him. This is disadvantageous.

Another disadvantage of using the tuple identities in filtering is that normally the presentity does not want watchers to know that a particular watcher is not allowed to get as detailed information as another watcher, or that the information given to different watcher groups is slightly or totally different from the information given to other watchers.

It is disadvantageous if the filtering settings change every time a watcher's authorization information is changed because of different detail level of information is provided to the watcher. This would be the case if the filtering is based on the unique tuple identities.

SUMMARY OF THE INVENTION

Embodiments of the present invention aim to overcome one or several of the above problems.

According to one aspect of the present invention, there is provided a communication system comprising a lest one user with which presence information is associated, said presence information comprising a plurality of parts, at least one of said parts comprising information identifying the application for which said at least one part is intended.

According to a second aspect of the present invention, there is provided a communication method comprising the steps of providing presence information for an associated user, said presence information comprising a plurality of parts, at least one of said parts comprising information identifying an application for which said at least one part is intended; and at least one entity obtaining at least one of said parts, said at least one entity having at least one entity application, the at least one entity obtaining the parts comprising information identifying said at least one entity application.

According to a third aspect of the present invention, there is provided a user in a communications system, said user having associated presence information, said presence information comprising a plurality of parts, said user being arranged to provide at least one of said parts with information identifying an application for which said at least one part is intended.

According to a fourth aspect in the present invention, there is provided an entity in a communications system, said entity comprising at least one application obtaining means for obtaining at least one part of presence information associated with an user, the at least one part comprising information identifying an application, the obtaining means being arranged to obtain the at least part comprising information identifying said at least one application.

The quite static filtering settings possible with embodiments of the invention are useful especially when the filters are stored in a certain server (e.g. in the presence list case) or the like beforehand.

Embodiments of the invention may permit the hiding of the fact from watchers that there is a different level of information (or totally different information) to available to different watchers.

Embodiments of the invention may allow changes in authorization without affecting e.g. filtering settings or some other functionality which can be separated from the authorisation by giving more semantics to presence information elements Embodiments of the invention may give the watcher the possibility to request semantically understandable information instead of basing the request on "non-meaningful" identity information.

BRIEF DESCRIPTION OF THE DRAWINGS

For a better understanding of the present invention and as to how the same may be carried into effect, reference will now be made by way of example only to the accompanying drawings, in which.

DETAILED DESCRIPTION OF EMBODIMENTS

Figure 1:
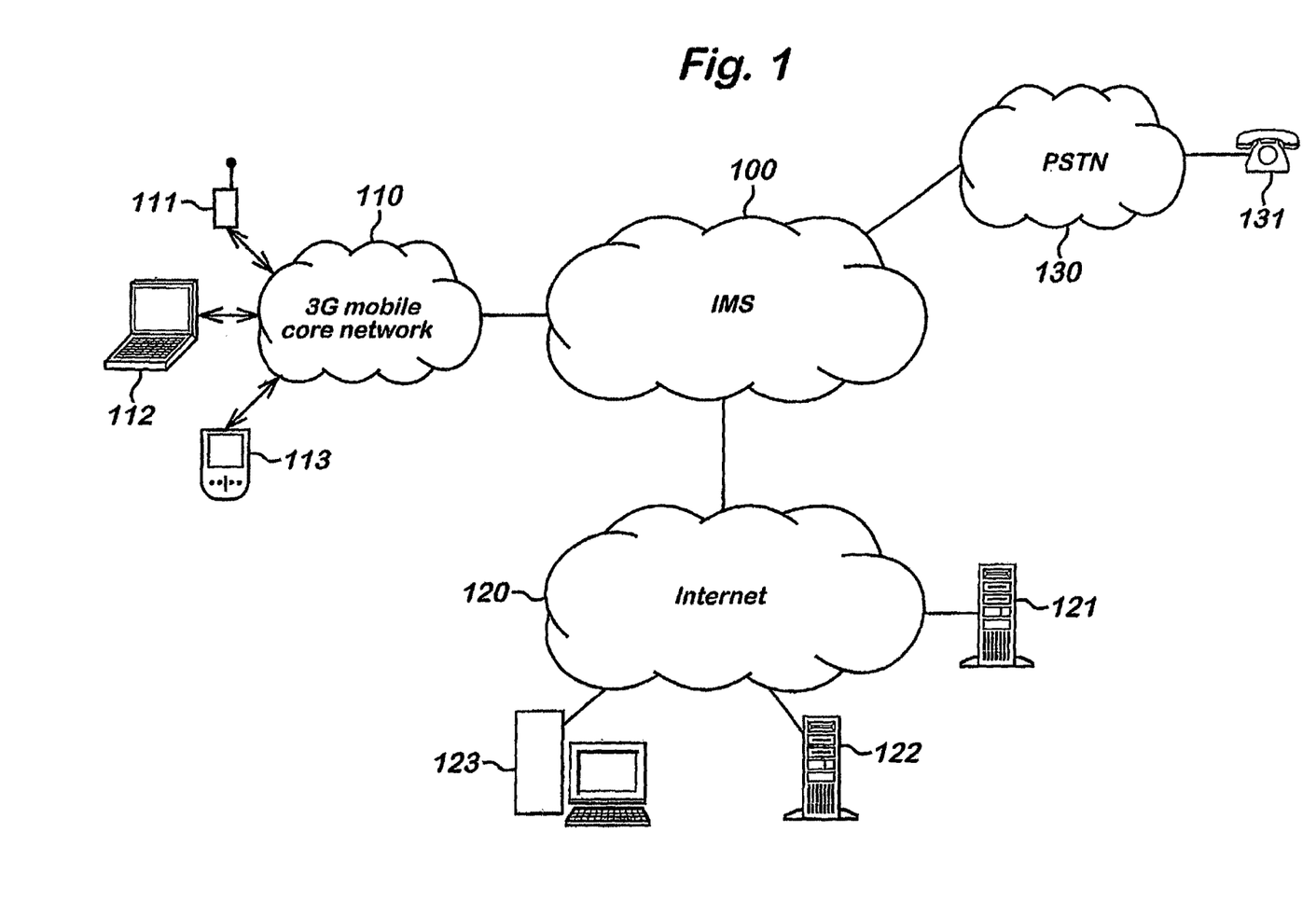
FIG. 1 illustrates a communication system wherein the present invention can be applied.

Reference will now first be made to the FIG. 1, which illustrates a typical $3^{rd}$ Generation (3G) Wireless telecommunications system operating under the Universal Mobile Telecommunications System (UMTS). At the hub of this system is the IP Multimedia Subsystem (IMS) 100 network, which routes calls and all kinds of sessions between two or more users (or between user and a network element e.g. application server) of the network and provides other network functions. Examples of users are mobile terminal 111, laptop 112, personal desktop assistant (PDA) 113, Public Switched Telephone Network (PSTN) telephone 131, computer terminal 123, and application server 121, and application server 122. The IMS uses an IP based network to handle these calls, which may include both voice calls and multimedia calls.

The IMS network effectively acts as a gateway in a 3G system between the users 111, 112, 113, and other networks such as a PSTN 130 and external IP based network 120. Signalling between the mobile terminal and other users of the IMS network, and within the IMS network, is done under the Session Initiation Protocol (SIP). All references to messages that follow are SIP messages unless otherwise stated, and will be shown in capitals. It should be appreciated that although the preferred embodiments of the present invention have been described in the context of SIP, other embodiments of the invention can be implemented in non SIP environments.

Figure 2:
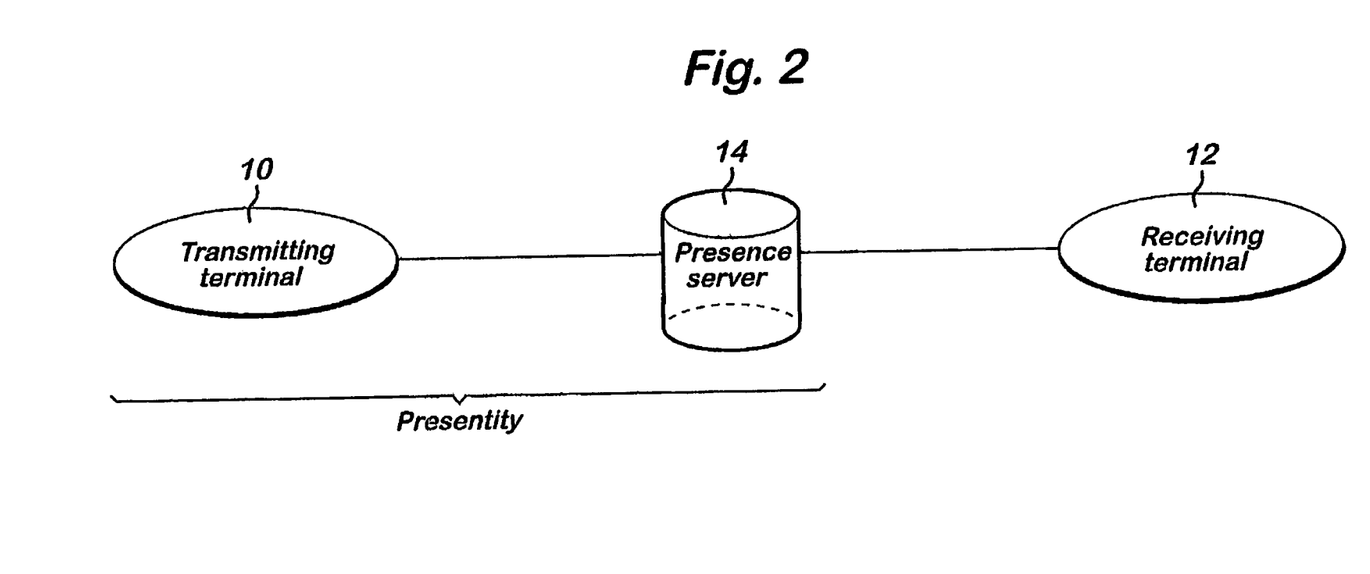
FIG. 2 illustrates schematically an embodiment of the invention.
Figure 3:
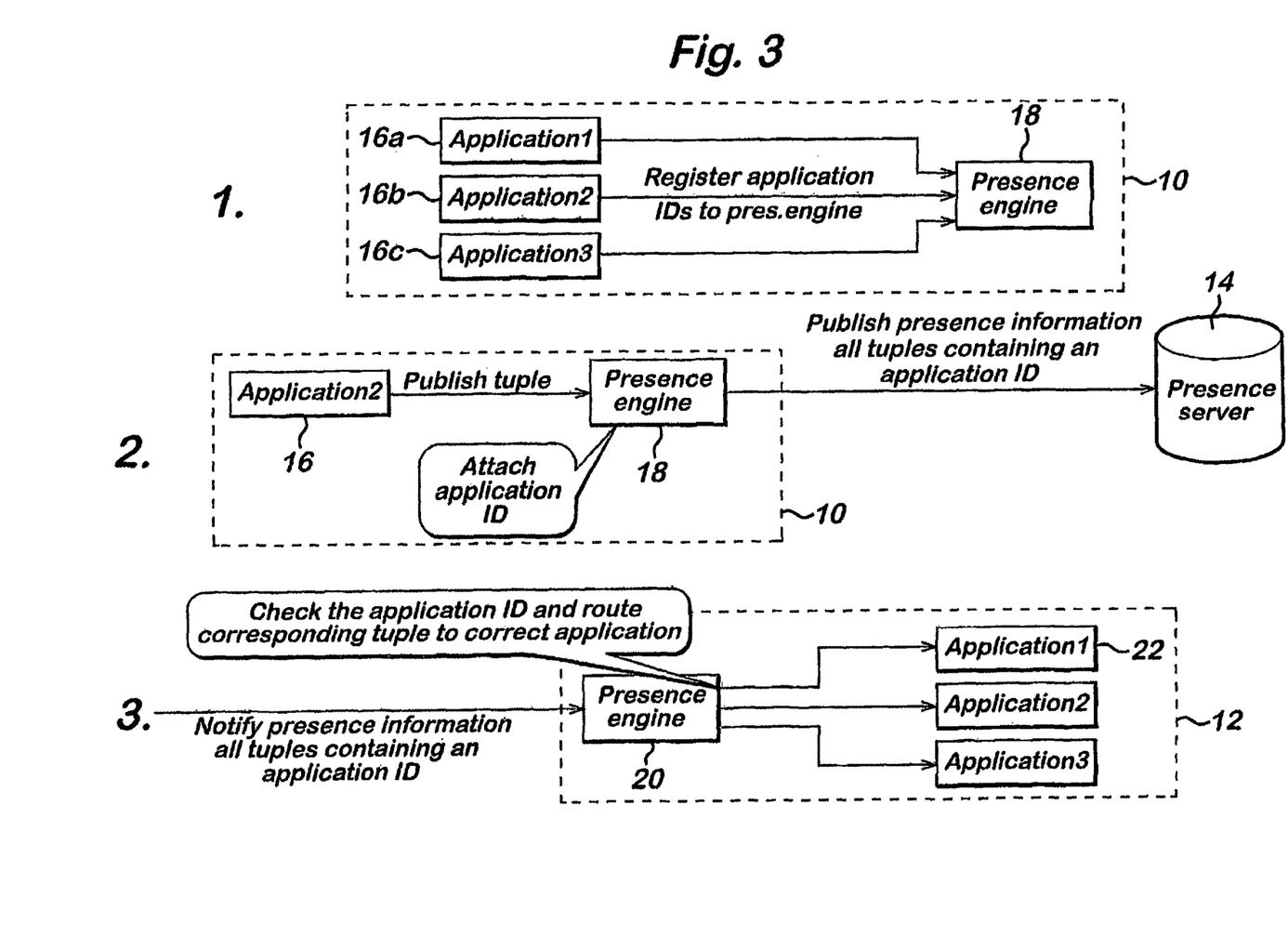
FIG. 3 illustrates the embodiment of FIG. 2 in more detail.

Reference will now be made to FIGS. 2 and 3 which show schematically an embodiment of the present invention. FIG. 2 shows a transmitting terminal 10 and a receiving terminal 12. The transmitting terminal 10 is arranged to provide presence information to the receiving terminal 12. A presence server 14 is provided. The presence server 14 and the transmitting terminal are sometimes referred to as a presentity. The presence server 14 provides the receiving terminal 12 with the required presence information. The presence server 14 will receive the presence information from the transmitting terminal. It should be appreciated that the connection between the transmitting terminal 10 and the presence server 14 as well as the connection between the presence server 14 and the receiving terminal will be via network elements or entities not shown.

In embodiments of the present invention, a transmitting terminal 10 (which can be any of the users as discussed above and can be referred to as a watched (or presentity) user) shall mark presence tuples so that receiving terminal 12 (which can be any of the users discussed above and can be referred to as a watcher) and possibly the presence server 14 can identify different parts of the presence information and pass them to the correct application. In particular, in embodiments of the present invention, a semantically meaningful application identity information field is provided in each tuple or at least some tuples. This field is referred to as the application ID field. The information may be the identity itself or information relating to the identity. The transmitting application inserts an application specific identifier into that application identity information field which can be recognised at the receiving end. The receiving terminal passes the tuples to the applications in that terminal identified in the application ID field.

This will be discussed in more detail with reference to FIG. 3. In step 1, the applications 16a, 16b and 16c residing in the transmitting terminal register their application identities with a presence engine 18 in the terminal. After this step applications can start publishing information, that is sending information to the presence server (and from there to the receiving terminal if the watcher has made a presence subscription). In the example shown in FIG. 3, the terminal is shown as having three applications. This is by way of example only and a terminal or other user can have more or less than three applications.

In step 2, each application 16 publishes presence information in form that contains one or more tuples and the presence engine attaches the application ID to each tuple. After that the presence engine 18 forwards the information to the presence server 14. In alternative embodiments the application can do the attachment of the application ID.

In step 3, the presence engine 20 of the receiving terminal 12 gets a NOTIFY message from the presence server 14 of new presence information. According to the application ID (carried in each tuple) the tuples are routed to the corresponding applications 22 of the receiving terminal by the presence engine. Alternatively, each application can receive all of the tuples but will ignore any tuple which has the wrong application identity.

Thus every application would have it own application ID. For example game1, game2, SMS, IM-1, IM-2, e-MAIL. If two terminals (1 and 2) have the same application, e.g. IM-1, the application ID is the same for that application. However, if terminal 3 has an application identified by IM-2 (made for example by another vendor) the application will have a different application ID than IM-1 application in terminals 1 and 2. In such cases the provided attributes may be used by the different application but care should be taken because it might be possible that the attributes or their values are not interpreted correctly. An example of this is where there are two different clients for IM. The basic functionality may be the same and thus the status attribute would be valid no matter which application interprets that but the remaining attributes may or may not be relevant at all.

As the tuples contain the application identification, it is possible to provide efficient (application specific) filtering capabilities and also to find the right application for which the tuples are intended.

Tuples have general structure as presented in draft-impp-cpim-pidf-05.txt (link: http.//www.ietf.org/internet-drafts/draft-ietf-impp-cpim-pidf-05.txt]. Applications can then extend the "include additional information" options by defining new XML namespaces. XML is Extensible Markup Language (World Wide Web—a markup language based on SGML, and designed to remove the limitation imposed by HTML. Allows a page to contain a definition and execution plan for the elements, and well as their content).

Who or what defines the different tuples to be used with different applications can vary. This may be dependent on the type of the application. Some or all tuples may be defined to have a standard format (standard attributes may be defined in for example the 3GPP standard). Alternatively or in addition, it is possible for application developers to define tuples of their own.

In general, there are no limits to the number of tuples or attributes within the tuples one presentity can have.

The entity that will put the application ID into each tuple can be the presence engine or the application publishing that information. The uniqueness of the application ID may in some embodiments of the present invention require its registration. This may be the case with the uniqueness of the application ID is within other applications as well as other collections of information which need a semantic meaning.

The application ID may be used in multivalue support and filtering. For example the application id can be used for hiding different "accuracy" levels of information. In that case the application id is not unique To clarify, the application information is unique in the sense that different applications should not use the same application ID but the same application ID can be present a multiple number of times in a presence server in the context of different tuples the tuple-id is unique but there is the same application id in e.g.

two or three tuples in a presentity's presence information. The application id can then be used in the filtering. In other words, the watcher (receiving terminal) may set a filter so that he does not receive all the available presence information from the watched user (presentity). This filter may be set so that the watcher only receives presence information for certain applications, the filter filters out certain presence information or a combination of the two.

Figure 5:
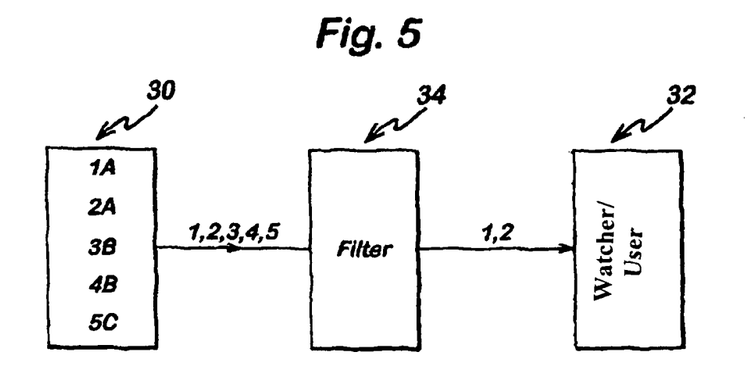
FIG. 5 illustrates schematically an embodiment of the invention.

For example, the following tuples are provided to the watcher (if provided by the presentity to the presence server) if a filtering is selected such that all tuples relating to "user provided location" are to be provided:

Presentity=ABC
TUPLE 1
tuple-id: xyz3226
application id="user provided location"
user provided location=TAMPERE
TUPLE 2
tuple-id: xyb3293
application id="user provided location"
user provided location=HOME
TUPLE 3
tuple-id: xya3288
application id="user provided location"
user provided location=x-coord, y-coord Reference is made to FIG. 5 in which a first presentity 30 provides tuples 1, 2, 3, 4 and 5. Each tuple contains an application ID so tuples 1 and 2 have application ID "A", tuples 3 and 4 have application ID "B" and tuple 5 has application "C". A watcher 32 only want tuples with application "A". A filter 34 thus filters the tuples and provides the user 32 with tuples 1 and 2. It should be appreciated that in practice the filter may be part of the presentity, part of a separate entity such as a server or part of the watcher 32. The application ID is thus used to filter the tuples.

The tuples may be intended for different users. Thus tuples 1, 3 and 5 may be intended for one watcher and tuples 2 and 5 for a different watcher. Thus the watcher may only be able to "see" tuples 1, 3 and 5. Accordingly if the watcher wants only the tuples for application "A", the watcher would be provided with tuple 1. The filter 34 provides this additional filtering. In some embodiments of the invention a separate filter is provided or a directing means is provided for ensuring that a watcher only gets the tuples intended for it.

It is also possible that different watcher groups have different presence information available to the respective groups.

Embodiments of the present invention permit applications to easily recognize from presence information what information that particular application can interpret and understand.

It should be appreciated that in embodiments of the present invention, the application identity may be used by the presence server when it performs the filtering operation. In some embodiments of the invention, an operator specific application can be provided in the presence server which would also utilise the application IDs. The presence server could for example modify some attribute values inside a tuple it understands and to which user has granted access rights to the presence server.

Embodiments of the present invention can be used to filter. For example a watcher can request only part of the presence information which relates to one or more specific applications. The filtering can be done by the presentity being watched—either by the user or the presence server, by the watcher or by any other entity. The filter information can be prestored so that whenever presence information is provided by a specific presentity to a specific watcher, it will be filtered in accordance with the required applications. The filtering can define the applications required, the applications not required or by a combination of these techniques.

As mentioned above a watcher is typically a user as discussed above. A "presentity" can be regarded as being a user and a presence server associated with that user. The presence server stores presence information for the users which are associated with that presence server. It should be appreciated that in practice, more than one user would be associated with each server. The presence server may be located in an end device (in terminal).

Presence information as currently defined in 3GPP can include the following information: (information but is not restricted to these and the requirements from stage 1 (requirements group) working on the standards is to develop a concept that enable presence to be extended.

Subscriber status; Network status; communication means; Contact address, Subscriber provided location; Network provided location; text; priority.

Presence can also include other information like mood, favourite colour and etc.

It should be appreciated that embodiments of the invention are not restricted to the attribute called application identity information but can be applied to any attribute providing a similar type of operational possibility.

Embodiments of the present invention are not limited to the use of tuples. Not all systems use tuples for structuring presence document, for example wireless village presence handles presence information at an attribute level and in such case the application ID is linked to each separate attribute.

Figure 4:
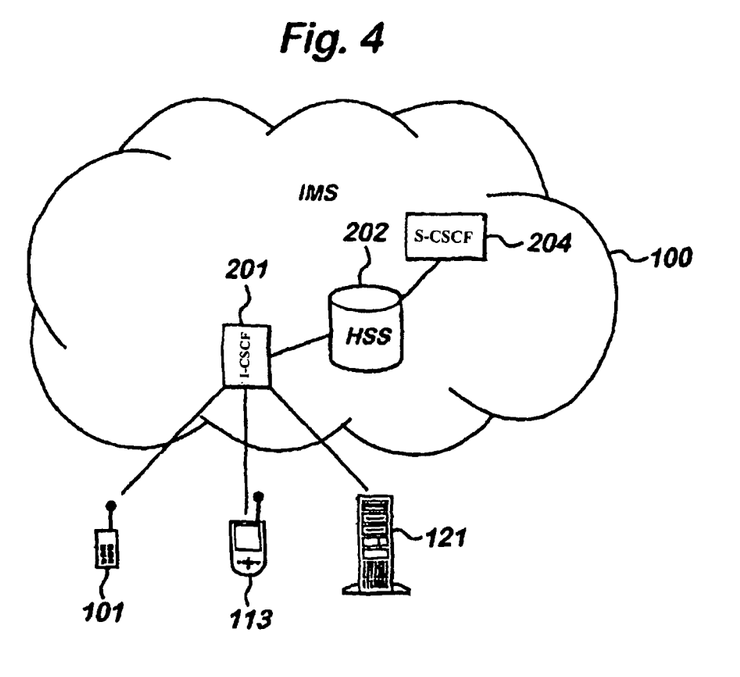
FIG. 4 illustrates the IMS part of the system of FIG. 1 in more detail.

FIG. 4 shows a schematic of the IMS network 100. The IMS includes various elements including several Call State Control Functions (CSCF). A CSCF is equivalent to a SIP server in the IETF architecture.

The Interrogating CSCF (I-CSCF) 201 is the basic IMS node used for terminating calls in the IMS network, functioning at the edge of the network. Here, it is shown communicating with the external nodes of a mobile terminal 101, a PDA 113, and an application server (AS) 121. It should be appreciated that the connections between the mobile terminal, the PDA and the application server to the I-CSCF may not be direct, but via a suitable intermediate network such as the mobile core network 110 for the mobile terminal, and the Internet 120 for the application server, as shown in FIG. 1.

The HSS 202 is a centralised user database that interfaces with both the I-CSCF and the S-CSCF204, storing information on all users of the IMS. The I-CSCF uses the HSS to perform functions such as authorising of new users and retrieving routing information on the S-CSCF for forwarding messages from external elements to the S-CSCF.

The S-CSCF is the IMS node responsible for invoking services related to IMS users. In this example, the S-CSCF also performs registrar functionality for IMS users, processing user registrations, The presence server functionality is implemented as application server.

It should be appreciated that the description of FIG. 4 is only a schematic representation and in practice additional elements such as for example a proxy-CSCF (P-CSCF) something missing from the sentence. It should also be appreciated that embodiments of the invention may be used in systems other than those shown in FIG. 4.

A presence package may be used for subscribing to the presence information of any user. The semantics of the presence package means that any user can send a subscription message for presence information to the presence server, but if there is no such presence package defined, the presence server would not be able to recognise to what event the user was trying to subscribe to. Therefore, the presence package needs to be defined at the presence server, which can then receive and recognise that the subscription message for the associated event for changes in presence information. The presence server creates a state linked to the presence information, and when any change in the presence information occurs, it will trigger a response or notification.

It should be appreciated that although embodiments of the present invention have been described in the context of 3G using SIP, other suitable systems and interface protocols could be used. In particular, embodiments of the present invention may be used in application in accordance with IETF specifications.

It should also noted herein that while the above describes exemplifying embodiments of the invention, there are several variations and modifications which may be made to the disclosed solution without departing from the scope of the present invention as defined in the appended claims.

The invention claimed is:

1. An apparatus comprising a transmitting terminal including a presence engine, the apparatus also comprising one or more network connection elements, the transmitting terminal configured to at least perform:
   storing presence information associated with at least one user, said presence information comprising a plurality of parts, at least one of said parts comprising an application identifier identifying an application for which said at least one part is intended,
   wherein said part of information comprises a tuple and said tuple comprises information identifying said user and said application identifying information;
   receiving a request from a watcher entity for only one or more parts of the plurality of parts of said presence information, wherein the one or more parts relate to a specific application of said watcher entity identified by use of the application identifier; and
   providing presence information associated with said at least one user to said watcher entity, wherein providing the presence information comprises utilizing a session initiation protocol server to provide the stored presence information to the watcher entity in an internet protocol multimedia subsystem.

2. The apparatus of claim 1, wherein said at least one user terminal comprises user equipment.

3. The apparatus of claim 1, wherein said presence information comprises at least one of the following parts of information: subscriber status; network status; communication means; contact address; subscriber provided location; network provided location; text; priority; mood; or favorite color.

4. The apparatus of claim 1, wherein said apparatus comprises a filter to provide only the requested parts of said presence information.

5. The apparatus of claim 4, wherein said filter is configured to use said information to filter said presence information.

6. A method, comprising:
   receiving, at a transmitting terminal, at least a portion of presence information associated with a user, said presence information comprising a plurality of parts, at least one of said parts comprising an application identifier identifying an application for which said at least one part is intended, wherein receiving the presence information comprises utilizing a session initiation protocol server to receive the presence information from a presence server in an internet protocol multimedia subsystem,
   wherein said part of information comprises a tuple and said tuple comprises information identifying said user and said application identifying information;
   receiving a request from a watcher entity for only one or more parts of the plurality of parts of said presence information, wherein the one or more parts relate to a specific application of said watcher; and
   causing at least one of said parts to be provided, from the transmitting terminal, to the watcher entity, said watcher entity comprising the specific application, the watcher entity obtaining the parts comprising the application identifier identifying said specific application for said specific application.

7. The method of claim 6, further comprising:
   processing the specific application, said at least one part of the presence information which comprises information identifying the specific said entity application.

8. An apparatus comprising a receiving terminal, including a presence engine, the apparatus also comprising one or more network connection elements, the receiving terminal configured to at least:
   request from a watcher entity only one or more parts of a plurality of parts of presence information associated with a user, wherein the one or more parts relate to a specific applications;
   receive at the watcher entity the only one or more parts of presence information utilizing a session initiation protocol server to receive the presence information from a presence server in an internet protocol multimedia subsystem; and
   associate presence information, wherein said presence information comprises a plurality of parts, wherein said apparatus is configured to provide at least one of said parts with an application identifier identifying an application for which said at least one part is intended, wherein said part of information comprises a tuple and wherein said tuple comprises information identifying the apparatus and said application identifying information.

9. An apparatus comprising a receiving terminal including a presence engine, the apparatus also comprising one or more network connection elements, the receiving terminal configured to at least perform:
   executing a specific application; and
   causing at least one part of presence information associated with an user to be obtained by a watcher entity, by the watcher entity requesting only one or more parts of a plurality of parts of said presence information processed by the application, the at least one part comprising an application identifier identifying the specific application, wherein said part of information comprises a tuple and said tuple comprises information identifying said user and said application identifying information,
   wherein obtaining comprises obtaining the at least one part comprising the application identifier identifying the application for the application, and wherein obtaining the at least one part of presence information comprises utilizing a session initiation protocol server to obtain presence information from the watcher entity in an internet protocol multimedia subsystem.

10. The apparatus of claim 9, wherein the specific application identified in said at least one part is configured to process said at least one part of the presence information that comprises information identifying said specific application.

11. An apparatus comprising a transmitting terminal including a presence engine, the apparatus also comprising one or more network connection elements, the transmitting terminal configured to at least:
associate presence information, wherein said presence information comprises a plurality of parts; and
provide, in response to a request from a watcher entity for only one or more parts of the plurality of parts of said presence information, wherein the one or more parts relate to a specific application of said watcher entity, at least one of said only one or more parts with an application identifier identifying an application for which said at least one part is intended, wherein said part of information comprises a tuple and said tuple comprises information identifying a user and application identifying information, wherein providing the application identifier comprises utilizing a session initiation protocol server to provide a stored application identifier to the watcher entity in an internet protocol multimedia subsystem.

12. An apparatus comprising a receiving terminal including a presence engine, the apparatus also comprising one or more network connection elements, the receiving terminal comprising:
a specific application; and
a watcher entity for obtaining only one or more parts of a plurality of parts of presence information associated with a user and, wherein the one or more parts relate to a specific application of said watcher entity, the only one or more parts comprising an application identifier identifying the specific application, wherein said part of information comprises a tuple and said tuple comprises information identifying said user and said specific application identifying information,
wherein the obtaining means is configured to obtain the at least one part comprising the application identifier identifying the specific application, and wherein obtaining the at least one part of presence information comprises utilizing a session initiation protocol server to obtain stored presence information from the watcher entity in an internet protocol multimedia subsystem.

13. The apparatus as claimed in claim 8, wherein said apparatus is a user terminal.

14. The apparatus of claim 8, wherein the apparatus comprises a presence engine.

15. The apparatus of claim 14, wherein the specific application is configured to register with said presence engine said information identifying said application.

16. The apparatus of claim 14, wherein at least one of the specific application and said presence engine are configured to add said identifying information to at least one part of the presence information.

17. The apparatus of claim 8, wherein said presence information comprises at least one of the following parts of information: subscriber status; network status; communication means; contact address; subscriber provided location; network provided location; text; priority; mood; or favorite color.

18. The apparatus of claim 9, wherein the apparatus is configured to receive said at least one part of said information.

19. The apparatus of claim 18, wherein the apparatus is configured to direct said at least one part of said information to the identified specific application.

20. The apparatus of claim 9, wherein the apparatus comprises an application engine, which is configured to direct said at least one part of said information to the identified specific application.

21. The apparatus of claim 9, wherein the apparatus comprises a user terminal.

22. The apparatus of claim 9, wherein the apparatus is configured to receive said at least one part of said information in response to a request from the apparatus.

23. The apparatus of claim 9, wherein said presence information comprises at least one of the following parts of information: subscriber status; network status; communication means; contact address; subscriber provided location; network provided location; text; priority; mood; or favorite color.

24. The apparatus of claim 9, wherein a filter is provided to provide only the requested parts of said presence information.

25. The apparatus of claim 24, wherein said filter is provided in at least one of a server, a presence server, and at least one user terminal.

26. The apparatus of claim 9, wherein the apparatus is caused to use said information to filter said presence information.

27. A method comprising:
providing presence information, from a transmitting terminal, in response to a request from a watcher entity for only one or more parts of a plurality of parts of presence information, wherein the one or more parts relate to a specific application of said watcher entity, wherein said presence information comprises a plurality of parts, wherein at least one of said parts is provided with an application identifier identifying an application for which said at least one part is intended, wherein said part of information comprises a tuple and wherein said tuple comprises information identifying a user and said specific application identifying information, and wherein providing the presence information comprises utilizing a session initiation protocol server to provide the stored presence information in an internet protocol multimedia subsystem.

28. A transmitting terminal including a presence engine, the transmitting terminal also comprising one or more network connection elements, the transmitting terminal comprising:
a first computer executable component configured to provide presence information, in response to a request from a watcher entity for only one or more parts of a plurality of parts of said presence information, wherein the one or more parts relate to a specific application, wherein said presence information comprises a plurality of parts, wherein at least one of said parts is provided with an application identifier identifying an application for which said at least one part is intended, wherein said part of information comprises a tuple and wherein said tuple comprises information identifying a user and said specific application identifying information, wherein providing the presence information comprises utilizing a session initiation protocol server to provide stored presence information in an internet protocol multimedia subsystem.

29. A receiving terminal including a presence engine, the receiving terminal also comprising one or more network connection elements, the receiving terminal comprising:
a first computer executable component comprising a watcher entity configured to use presence information associated with at least one user, wherein said presence information comprises a plurality of parts, at least one of said parts comprising an application identifier identifying an application for which said at least one part is intended, said first computer executable component configured to use said application identifier identifying the application to obtain only one or more parts of the plurality of parts of said presence information, wherein the one or more parts relate to a specific application, wherein said part of information comprises a tuple and said tuple comprises information identifying said user and said specific application identifying information, and wherein the first computer executable component is configured to receive the presence information by utilizing a session initiation protocol server to receive the presence information for the computer executable component in an internet protocol multimedia subsystem.

30. The method of claim 6, further comprising:
directing said at least one part of said information to the identified specific application.

31. The method of claim 6, further comprising:
sending a request,
wherein said receiving comprises receiving said at least one part of said information in response to the request.

32. The method of claim 6, wherein said presence information comprises at least one of the following parts of information: subscriber status; network status; communication means; contact address; subscriber provided location; network provided location; text; priority; mood; or favorite color.

33. The method of claim 27, further comprising:
receiving said at least one part of said information.

34. The method of claim 27, further comprising:
directing said at least one part of said information to the identified specific application.

35. The method of claim 27, further comprising:
sending a request; and
receiving said at least one part of said information in response to the request.

36. The method of claim 27, wherein said presence information comprises at least one of the following parts of information: subscriber status; network status; communication means; contact address; subscriber provided location; network provided location; text; priority; mood; or favorite color.

37. The method of claim 27, further comprising:
filtering said presence information using said information identifying said specific application.

38. The apparatus of claim 1, wherein only specific one or more parts of said presence information are available to be provided to said watcher entity and wherein a different specific one or more parts of said presence information are available to be provided to a different watcher entity.

* * * * *